United States Patent [19]

Eisenberg

[11] Patent Number: 5,895,475
[45] Date of Patent: Apr. 20, 1999

[54] SOFTWARE NOTES DESIGNING

[75] Inventor: Peter M. Eisenberg, Minneapolis, Minn.

[73] Assignee: Minnesota Mining and Manufacturing Company, St. Paul, Minn.

[21] Appl. No.: 08/658,894

[22] Filed: May 31, 1996

[51] Int. Cl.$^6$ ................................................ G06F 17/60
[52] U.S. Cl. ............................................................ 707/517
[58] Field of Search .................................... 395/761–769; 707/505–510, 530, 502, 500

[56] References Cited

U.S. PATENT DOCUMENTS

| | | | |
|---|---|---|---|
| 4,718,784 | 1/1988 | Drisko | 400/68 |
| 5,603,021 | 2/1997 | Spencer et al. | 345/326 |
| 5,621,864 | 4/1997 | Benade et al. | 395/117 |
| 5,623,679 | 4/1997 | Rivette et al. | 707/526 |
| 5,623,681 | 4/1997 | Rivette et al. | 707/522 |

FOREIGN PATENT DOCUMENTS

| | | |
|---|---|---|
| 0 632 408 A1 | 1/1995 | European Pat. Off. |
| 8077242 | 3/1996 | Japan . |
| WO 92/21097 | 11/1992 | WIPO . |
| WO 95/29463 | 11/1995 | WIPO . |

OTHER PUBLICATIONS

Feldman, CorelDraw Now!, pp. 2–6, 1993.
Novell, WordPerfect User's Guide, pp. 311–318, 1994.
Corel, Corel Draw User's Manual, pp. 503–507, 1993.
Borland, Quattro Pro User's Guide, pp. 165–166, 1990.
Bryan J., Desktop Publication Made Easy: Windows Desktop Publishing is More Accessible Than Ever, *Byte* 18:91–93 (1993).
Build–A–Check, *IBM Technical Disclosure Bulletin* 34(6):32–33 (1991), New York.
Sticker and Label Store, "Label Store" for Windows—CD–Rom, DogByte Development, 612 Moulton Avenue, Suite 7, Los Angeles, California 90031.
Avery "LABELPRO™ for Windows", U.S. Version, 2.0 HD, 511811201995, Copy of User's Guide USW2.3 and two program diskettes, 1994 Avery Dennison Corporation.
Corel, Copy of "Corel Flow *Quick and Powerful Diagrams!*" Product Pamphlet, undated.
Copy of "The World's Easiest™ BusinessCard & StationeryMaker™ Special Bundle" User's Guide and two program diskettes, 1994 by T/Maker Company®.

*Primary Examiner*—Anton Fetting
*Attorney, Agent, or Firm*—Fish & Richardson P.C., P.A.

[57] ABSTRACT

Sticky back notes may be designed in a region displayed by a monitor of a data processing system. The region may be window which contains a layout area, a note design area, and a sample area. The layout area may have a plurality of note cells, wherein each note cell corresponds to a note to be designed and printed on a sheet of sticky back notes. The note design area is an area where a note may be designed. The sample area contains a sample note which may be imported to the note design area and/or to a note cell of the layout area during the design of notes to be printed on the sheet of sticky back notes.

70 Claims, 12 Drawing Sheets

SOFTWARE NOTES DESIGNING

TECHNICAL FIELD OF THE INVENTION

The present invention relates to a program which facilitates a user in the design of notes such as sticky-back paper Post-it® notes.

BACKGROUND OF THE INVENTION

Sticky-back notes, such as Post-it® notes, are popularly used for a wide variety of purposes. These notes are offered commercially to users in a variety of colors and with a variety of graphical and/or textual designs. The designs of notes, however, are essentially fixed as far as users are concerned because the designs are produced by note suppliers and because users have basically no facility permitting them to create their own note designs for sticky back notes.

By contrast, there is currently on the market a program which permits users to create their own address label designs. Upon execution of this program, a user is presented with a user selectable template having a plurality of address label cells. This template corresponds to a sheet of address labels which may be fed into, and printed by, a printer. Accordingly, each address label cell of the template corresponds to an address label on the sheet. The program also contains a plurality of sample address label designs which may be used to fill in the address label cells on the template. However, in order to select a sample address label, the user must exit the template screen and then choose a file name of a selected sample from a directory. Thus, the sample address label designs and the template are not simultaneously displayed to the users. Moreover, graphical and textual material of the sample address label designs may not be dragged together to the template.

There are also currently on the market drawing and flow chart programs which permit users to design their own drawings and flow charts. Upon execution of such a program, a user is presented with a design area in which a flow chart may be designed. The user is also presented with a sample area in which various sample graphical designs are offered to the users. These sample graphical designs may be dragged to the design area during design of a flow chart. However, these flow chart programs do not also present a template area similar to the template area presented by the address label program described above. Moreover, although a sample graphical design may be dragged from the sample area to the design area, a flow chart design may not be dragged to the design area, and graphical and textual material may not be dragged together to the design area. Furthermore, in neither the drawing and flow chart programs nor the address label design programs described above may new designs of the user be imported into a sample area or sample file.

There are other programs currently on the market which permit users to design their own checks, business cards, and the like. However, these programs are as inflexible as currently known address label design programs and drawing and flow chart programs.

The present invention overcomes one or more of the problems discussed above.

SUMMARY OF THE INVENTION

In one aspect of the present invention, a method of designing notes comprises the steps, performed by a data processing system, of (i) executing program code in the data processing system so that a layout area is displayed, wherein the layout area has a plurality of note cells, and wherein each note cell corresponds to a note to be designed, (ii) executing program code in the data processing system so that a design area is displayed with the layout area, wherein the design area is an area where a note may be designed, and (iii) executing program code in the data processing system so that a sample area is displayed with the layout area and the design area, wherein the sample area contains a sample note.

In another aspect of the present invention, a method of designing notes comprises the steps, performed by a data processing system, of (i) executing program code in the data processing system so that a layout area is displayed, wherein the layout area has a plurality of note cells, and wherein each note cell corresponds to a note to be designed, (ii) executing program code in the data processing system so that a design area is displayed with the layout area, wherein the design area is an area where a note may be designed, and (iii) executing program code in the data processing system so that a note design may be imported between the design area and a note cell of the layout area.

In yet another aspect of the present invention, a method of designing notes comprises the steps, performed by a data processing system, of (i) executing program code in the data processing system so that a sample area is displayed, wherein the sample area contains a sample note, wherein the sample note has first and second elements, and wherein the first and second elements are different, (ii) executing program code in the data processing system so that a design area is displayed with the sample area, wherein the design area is an area where a note may be designed, and (iii) executing program code in the data processing system so that the first and second elements are dragged together from the sample area to the design area.

In still another aspect of the present invention, a method of designing notes comprises the steps, performed by a data processing system, of (i) executing program code in the data processing system so that a sample area is displayed, wherein the sample area contains sample notes, (ii) executing program code in the data processing system so that a design area is displayed with the sample area, wherein the design area is an area where a note may be designed by a user, and (iii) executing program code in the data processing system so that a user designed note design is imported to the sample area to become a sample note.

In a still further aspect of the present invention, an article of manufacture comprises a computer readable storage medium and program code stored on the computer readable storage medium, wherein the program code is arranged so that, when the program code is executed, (i) a layout area is displayed, wherein the layout area has a plurality of note cells, and wherein each note cell corresponds to a note to be designed, (ii) a design area is displayed with the layout area, wherein the design area is an area where a note may be designed, (iii) and a sample area is displayed with the layout area and the design area, wherein the sample area contains a sample note.

In another aspect of the present invention, a computer readable storage medium has program code stored thereon, wherein the program code is arranged so that, when the program code is executed, (i) a layout area is displayed, wherein the layout area has a plurality of note cells, and wherein each note cell corresponds to a note to be designed, (ii) a design area is displayed with the layout area, wherein the design area is an area where a note may be designed, (iii) and a note design may be imported between the design area and a note cell of the layout area.

In yet another aspect of the present invention, an article of manufacture comprises a computer readable storage medium and program code stored on the computer readable storage medium, wherein the program code is arranged so that, when the program code is executed, (i) a sample area is displayed, wherein the sample area contains a sample note, wherein the sample note has first and second elements, and wherein the first and second elements are different, (ii) a design area is displayed with the sample area, wherein the design area is an area where a note may be designed, and (iii) the first and second elements are dragged together from the sample area to the design area.

In still another aspect of the present invention, a computer readable storage medium has program code stored thereon, wherein the program code is arranged so that, when the program code is executed, (i) a sample area is displayed, wherein the sample area contains sample notes, (ii) a design area is displayed with the sample area, wherein the design area is an area where a note may be designed by a user, and (iii) a user designed note design is imported to the sample area to become a sample note.

In still another aspect of the present invention, a computer readable storage medium has program code stored thereon, wherein the program code is arranged so that, when the program code is executed, (i) first and second areas are displayed, (ii) the first area has multiple elements therein, (iii) the second area has multiple elements therein, (iv) the first area is arranged so that all elements in the first area can be selected only as a group, and (iv) the second area is arranged so that the elements in the first area can be selected individually.

BRIEF DESCRIPTION OF THE DRAWINGS

These and other features and advantages will become more apparent from a detailed consideration of the invention when taken in conjunction with the drawing in which.

DETAILED DESCRIPTION

Figure 1:
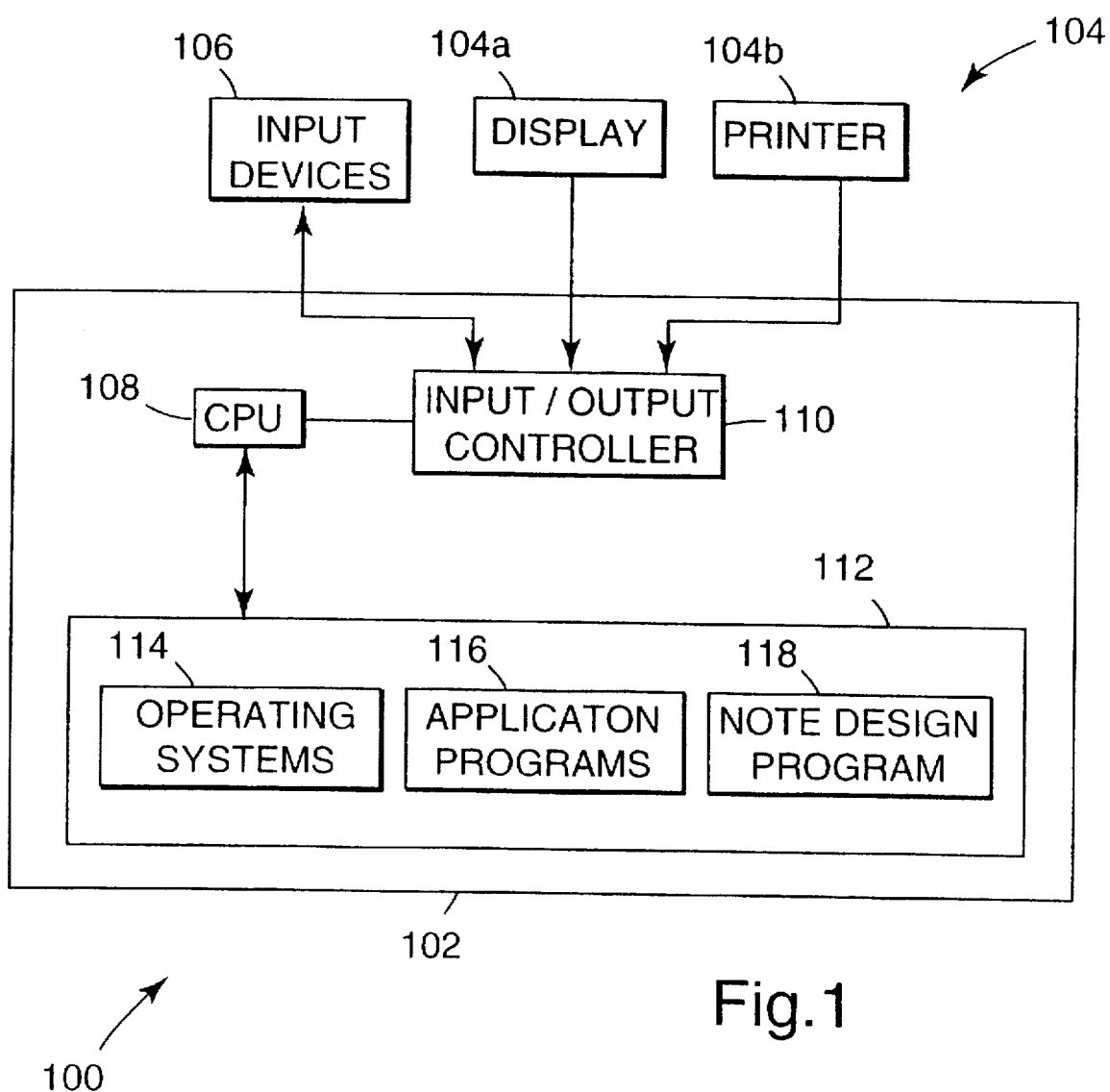
FIG. 1 is a block diagram of a data processing system which can be configured in accordance with the present invention.

One possible operating environment of the present invention is a data processing system, such as a data processing system 100 shown in FIG. 1. The data processing system 100, for example, may be a personal computer or work station which includes a processor 102, one or more display terminals 104, and one or more input devices 106. The display terminals 104 may include, for example, a monitor 104a having a viewing screen, a printer 104b, and/or the like. The input devices 106 may include, for example, a mouse, a keyboard, and/or similar devices.

The processor 102 includes a central processing unit (CPU) 108 which communicates with the display terminals 104 and the input devices 106 through an input/output controller 110, and which processes program code stored in a memory 112. The program code stored in the memory 112 includes, at least in part, an operating system 114, various application programs 116, and a note design program 118. The application programs 116 may include word processing programs, spread sheet programs, and the like. The note design program 118 is executed by the processor 102 in order to perform the functions of the present invention. The note design program 118 may contain defaults for page layouts, page color, font attributes, and the like.

Figure 2:
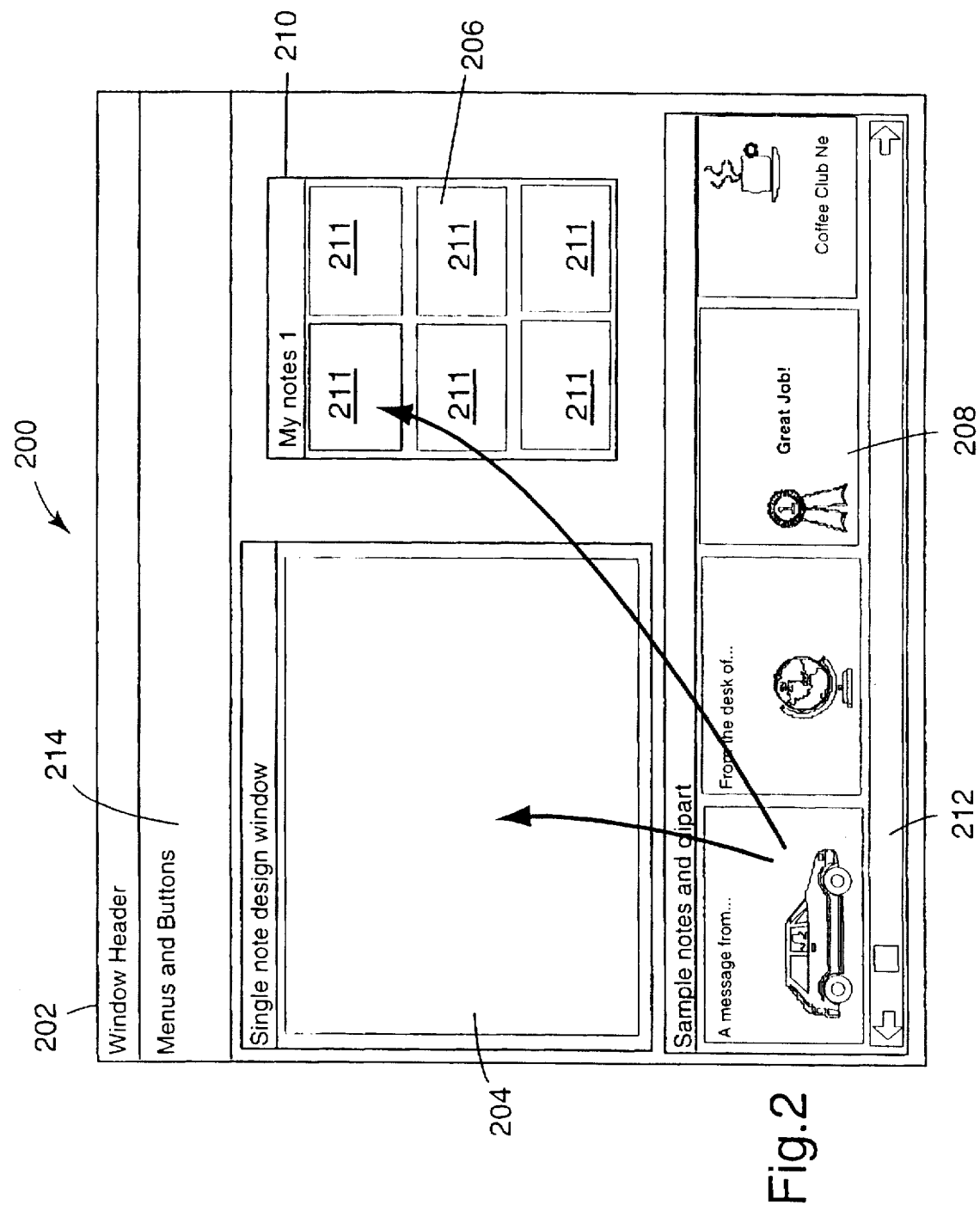
FIGS. 2–6 are representations of screen displays illustrating the design of notes as implemented by the present invention.

When a user enters the note design program 118, a screen display 200, as illustrated in FIG. 2, is presented. The screen display 200 includes a region preferably, although not necessarily, in the form of a window 202. The window 202 contains a note design area 204, a layout area 206, and a sample area 208. The note design area 204 may contain a note cell and may be used by the user for designing or customizing a note within the note cell of the design area 204.

The layout area 206 contains a layout window 210 having a plurality of note cells 211 laid out thereon in a format representing a sheet of notes which may be fed to the printer 104b. When a print instruction is sent to the printer 104b, the printer 104b prints, on the sheet of notes supplied thereto, the corresponding notes in the note cells 211 as designed by use of the note design program 118. The layout window 210 currently displayed in the layout area 206 presents six note cells 211 to the user as shown in FIG. 2.

The sample area 208 contains sample notes which may be imported into the note design area 204 and into one or more of the note cells 211 of the layout window 210 displayed in the layout area 206. Because the note design area 204 and the layout area 206 are functionally linked by the note design program 118, a note which is imported to one of these two areas is also imported to the other of these two area. Thus, if a note is imported to the design area 204, it is also imported to an active cell in the layout area 206, and if a note is imported to a cell of the layout area 206, the note is also imported to the note design area 204.

In order to travel through the sample notes displayed in the sample area 208, the window 202 may contain a scroll bar 212 with arrows which may be operated, for example, by a mouse in order to present additional sample notes to the user. In addition, the sample area 208 may be used to present clip art to the user. Clip art differs from sample notes in that each clip art is a single element whereas a sample note may contain multiple elements. Accordingly, clip art may be imported as individual graphical symbols from the sample area 208 into the note design area 204 and the note cells of the layout window 210 displayed in the layout area 206 while a user custom designs notes. This clip art is accessible by operating the scroll bar 212.

A sample note in the sample area 208 can be imported to the note design area 204 and a selected cell in the layout area 206 in any number of ways. One way of importing a sample note from the sample area 208 to the note design area 204 and a selected cell in the layout area 206 is to move a mouse cursor over a sample note in the sample area 208, grab the selected sample note (e.g., by depressing and holding the mouse button) in order to select the sample note, drag the selected sample note to the selected cell in the layout area 206 by use of the mouse, and drop the selected sample note (e.g., by releasing the mouse button) into the selected cell in the layout area 206. In this way, a copy of the selected sample note appears in both the selected cell in the layout area 206 and the note design area 204, and the original of the selected sample note remains in the sample area 208. When the sample note is grabbed, dragged, and dropped in this manner, all elements (such as text and graphic elements) are likewise grabbed, dragged, and dropped. Thus, all elements of the sample note are imported together into both the selected cell in the layout area 206 and the note design area 204.

Alternatively, a sample note in the sample area 208 may be imported to both the selected cell in the layout area 206 and the note design area 204 by clicking on the selected cell in the layout area 206 (i.e. by positioning a mouse cursor over the selected cell in the layout area 206 and by clicking the mouse button). A sample note in the sample note area 208 may then be selected by double clicking on the selected sample note (i.e. by positioning a mouse cursor over the selected sample note and by double clicking the mouse button). Upon double clicking on the selected sample note, a copy of the selected sample note is imported into both the selected cell in the layout area 206 and the note design area 204, and the original of the selected sample note remains in the sample area 208. Again, all elements of the selected sample note are imported together to both the selected cell in the layout area 206 and the note design area 204.

Accordingly, separate manipulations are not necessary in order to import all elements of a sample note to the selected cell in the layout area 206 and the note design area 204. Operations other than grabbing, dragging, and/or clicking (such as copy and paste) may be implemented in order to import a sample note to the selected cell in the layout area 206 and the note design area 204.

The selected note appearing in both the note design area 204 and in the layout window 210 may be customized in the note design area 204, if desired. A pair of arrows in FIG. 2 illustrate the selection by a user of a sample note from the sample area 208 and the importation of that note to both the note design area 204 and to a note cell 211 of the layout window 210 displayed in the layout area 206.

Figure 3:
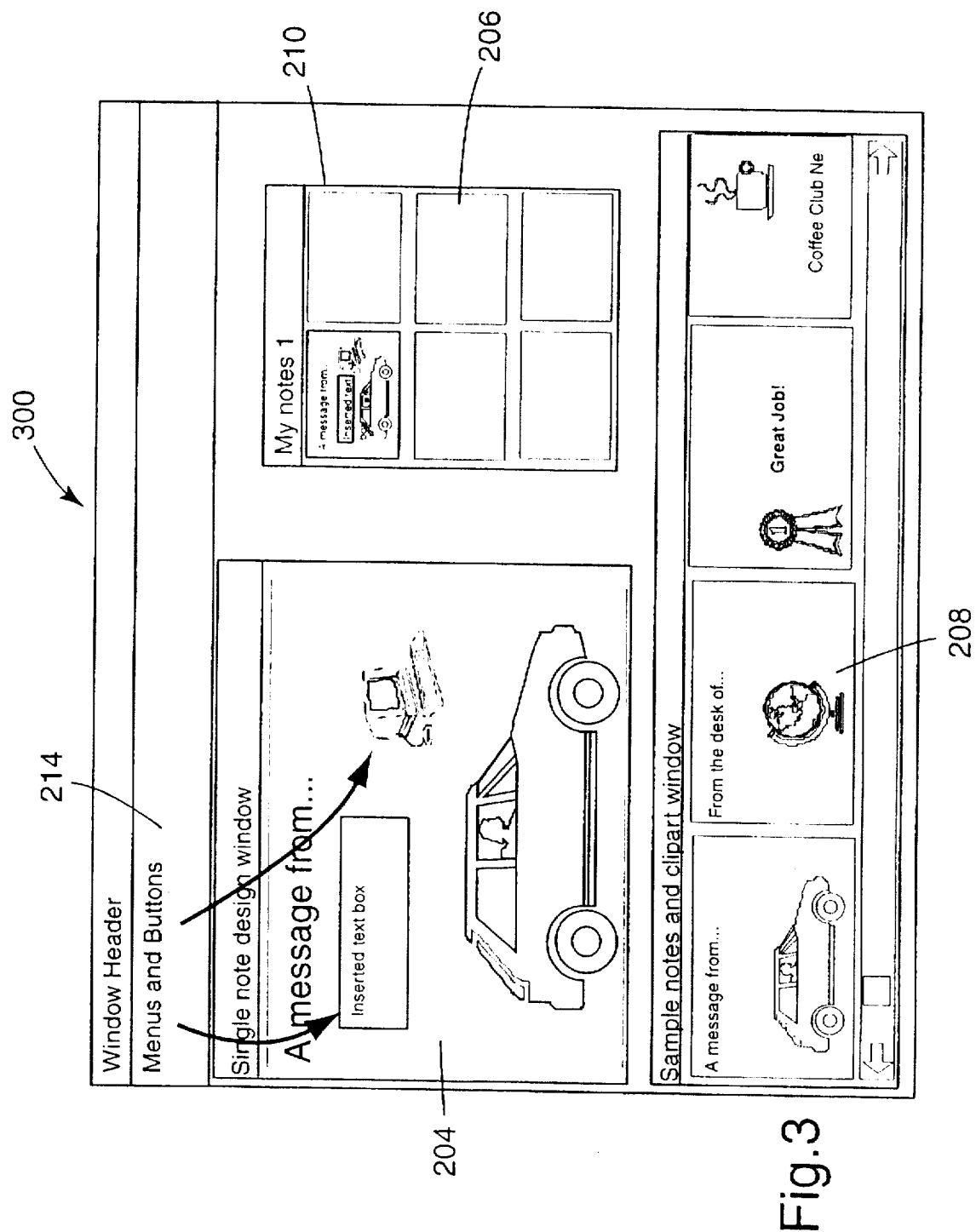

Accordingly, as shown by a screen display 300 in FIG. 3, the selected note appears both in the note design area 204 and in the selected note cell of the layout window 210 displayed in the layout area 206 as a result of importing the selected sample note from the sample area 208 to the selected note cell of the layout window 210 displayed in the layout area 206. As shown by the arrows in FIG. 3, the menu and button bar 214 may be used to add text and/or graphics to the note which appears in the note design area 204. Thus, even though a sample note is imported from the sample area 208, this note may be customized by use of the menus and tool buttons in the menu and button bar 214.

As illustrated in FIG. 3 by way of example, the user has inserted a graphical symbol in the form of a personal computer, and the user has also inserted a text box. These elements, i.e., the graphical symbol and the text box, may be inserted into the note design in the note design area 204 individually. Also, these elements, i.e., the graphical symbol and the text box, may be manipulated individually. Likewise, the original text and graphic elements contained in the sample note may likewise be individually manipulated once they appear in the note design area 204. As shown in FIG. 3, because the note design area 204 and the layout area 206 are functionally linked by the note design program 118, any action taken in the note design area 204 (such as the insertion of text and/or graphics) is reflected in the corresponding note cell of the layout window 210 displayed in the layout area 206.

Figure 4:
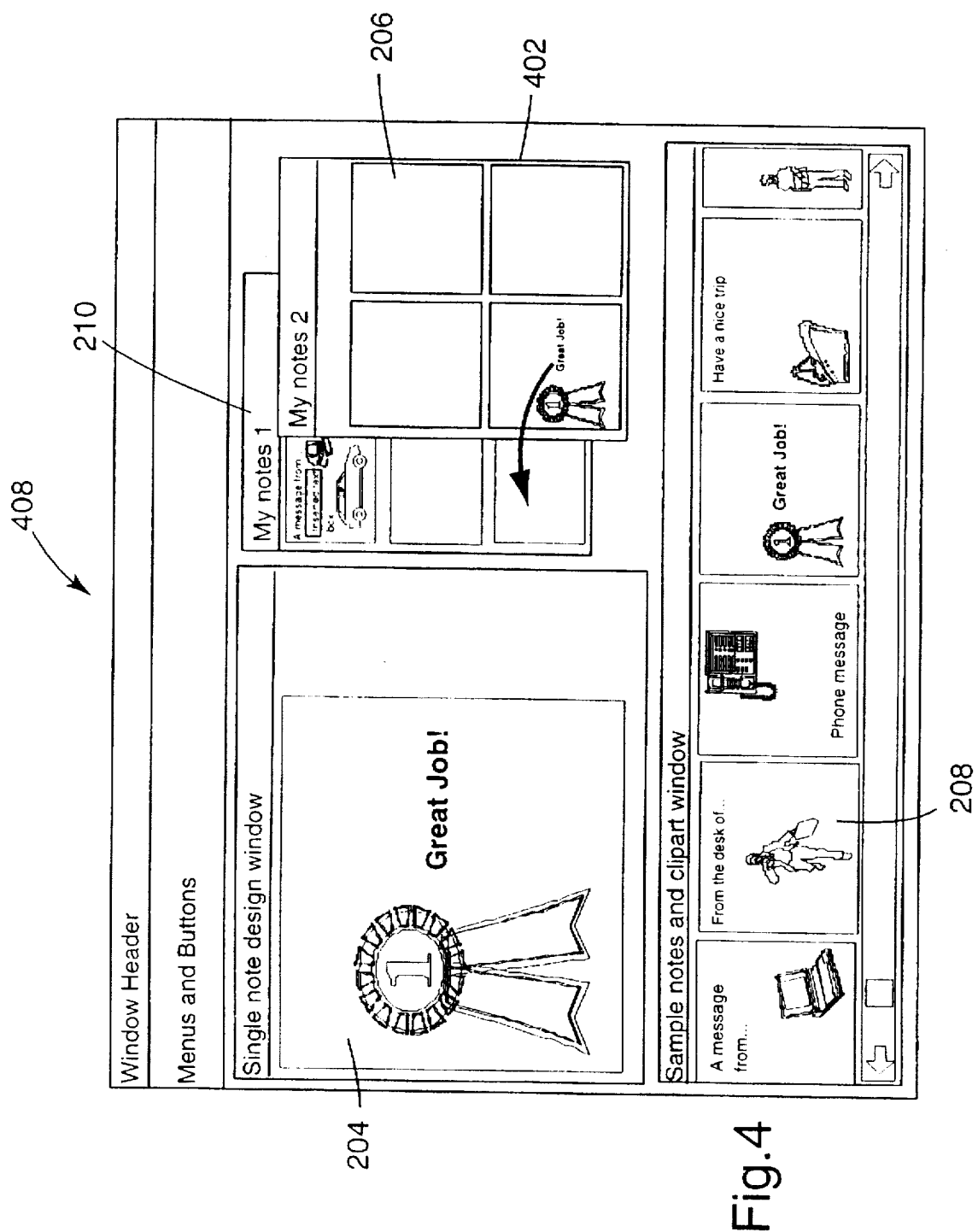

A screen display 400 shown in FIG. 4 illustrates that more than one layout window may be displayed in the layout area 206. For example, by suitable operation of a menu or button in the menu and button bar 214, a layout window 402 may be added to the layout window 210 in the layout area 206. Thus, the designs of notes for printing on different sheets of notes may be viewed without having to exit one layout window and opening another. Also, as shown in FIG. 4, the layout window 402 has note cells which are larger than the note cells of the layout window 210. The difference in size between the note cells of the layout window 210 and the note cells of the layout window 402 illustrates that the note design program 118 may be used to design and print notes of different sizes.

When the layout window 402 in the layout area 206 is active, it is displayed as the topmost layout window in the layout area 206. Accordingly, a sample note may be imported from the sample area 208 to the active layout window 402. FIG. 4 shows an example of a note having been imported from the sample area 208 to a note cell of the layout window 402 displayed in the layout area 206. Because this sample note is imported to a note cell of the layout window 402, this sample note also appears in the note design area 204. Therefore, as in the case of the exemplary note shown in FIG. 3, the note in the note design area 204 as illustrated in FIG. 4 may be customized as desired.

As illustrated by the arrow in FIG. 4, a note may be imported from a note cell of a layout window displayed in the layout area 206 to a note cell of another layout window displayed in the layout area 206. For example, a note may be imported from a note cell of the layout window 402 displayed in the layout area 206 to a note cell of the layout window 210 also displayed in the layout area 206 by grabbing, dragging, dropping, clicking, double clicking, or otherwise. Again, when a note is imported from a note cell of one layout window to a note cell of another layout window, all elements (e.g., such as text and graphic elements) of the imported note are imported together. When a note is imported from the layout window 402 to the layout window 210, the layout window 210 becomes active.

When the layout window 210 is active, the proportions of the note cell displayed in the note design area 204 correspond to the proportions of the note cells contained in the layout window 210, and when the layout window 402 is active, the proportions of the note cell displayed in the note design area 204 correspond to the proportions of the note cells contained in the layout window 402. Thus, as illustrated by a comparison of FIGS. 3 and 4, the proportions of the note cell displayed in the note design area 204 when the layout window 210 is active are different than the proportions of the note cell displayed in the note design area 204 when the layout window 402 is active.

Furthermore, the sample notes contained in the sample area 208 may (but do not necessarily) differ, at least in proportionality if not design, depending upon the proportions of the note cells of the active layout window.

Figure 5:
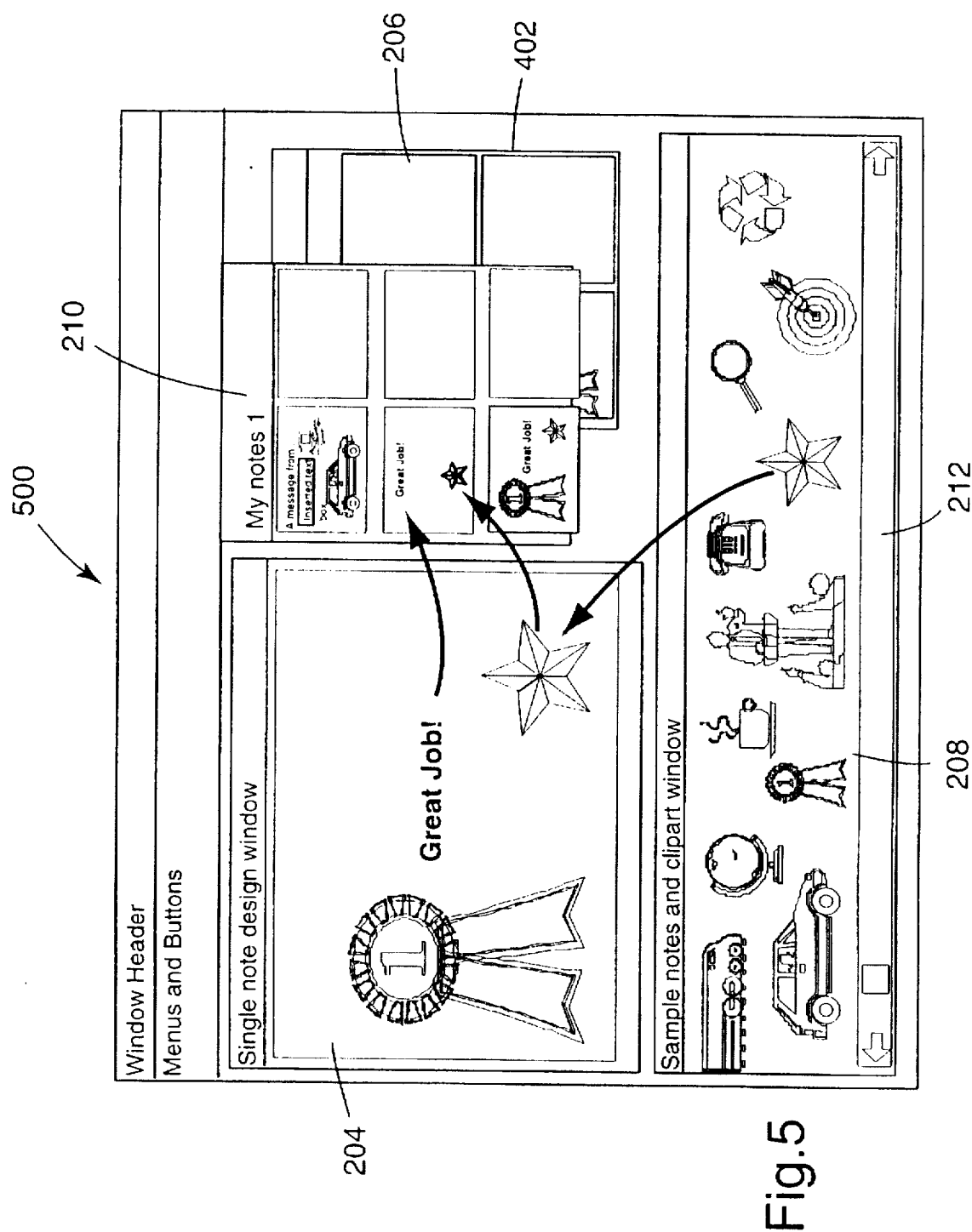

A screen display 500 shown in FIG. 5 illustrates examples of clip art which may be presented to the user in the sample area 208. This clip art is accessed in the sample area 208 by use, for example, of the scroll bar 212. A piece of clip art is distinguished from a sample note in that a sample note may have a plurality elements, but a piece of clip art is a single element.

Each piece of clip art may be imported, such as by grabbing and dragging and dropping, clicking and double clicking, or the like, from the sample area 208 to the note design area 204 and a note cell in a currently active layout window displayed in the layout area 206. Thus, when a piece of clip art is imported to a note cell in a currently active layout window displayed in the layout area 206, the piece of clip art appears both in the selected note cell of the currently active layout window displayed in the layout area 206 and in the note design area 204. Also, as shown by the arrows in FIG. 5, elements displayed in the note design area 204 may be imported individually to a cell in the layout area 206.

Figure 6:
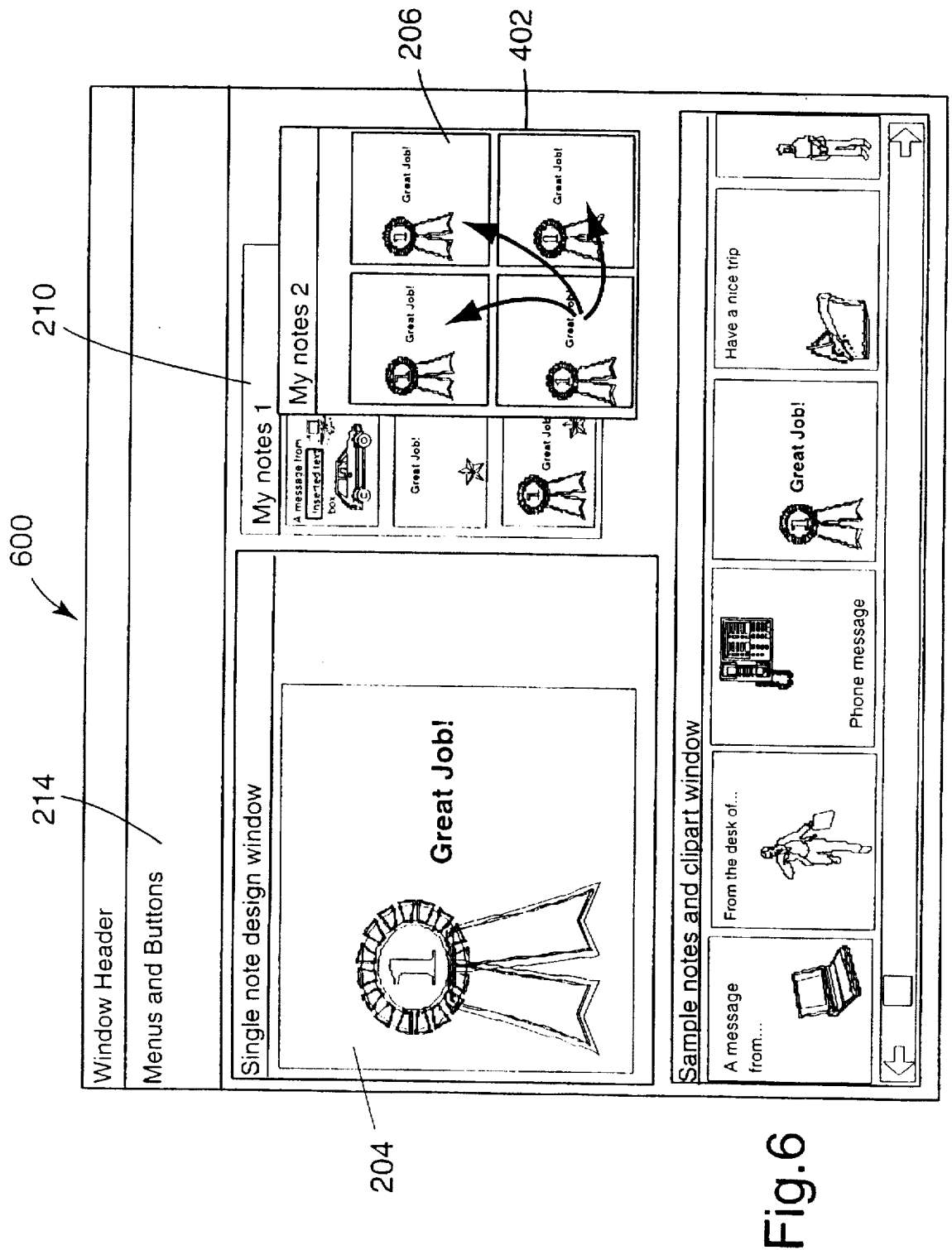

As illustrated by a screen display 600 in FIG. 6, a note in a note cell of a layout window displayed in the layout area 206 may be imported to all of note cells in that, or a different, layout window. For example, a note may be imported to all note cells of a layout window by clicking on the note to be imported and by using a fill menu or fill button in the menu and button bar 214. Alternatively, a note may be imported to all note cells of a layout window except for one or more selected note cells. As illustrated in FIG. 6, the user has chosen to select a note in a note cell of the layout window 402 and to fill all of the other note cells of the layout window 402 with the selected note.

Figure 7:
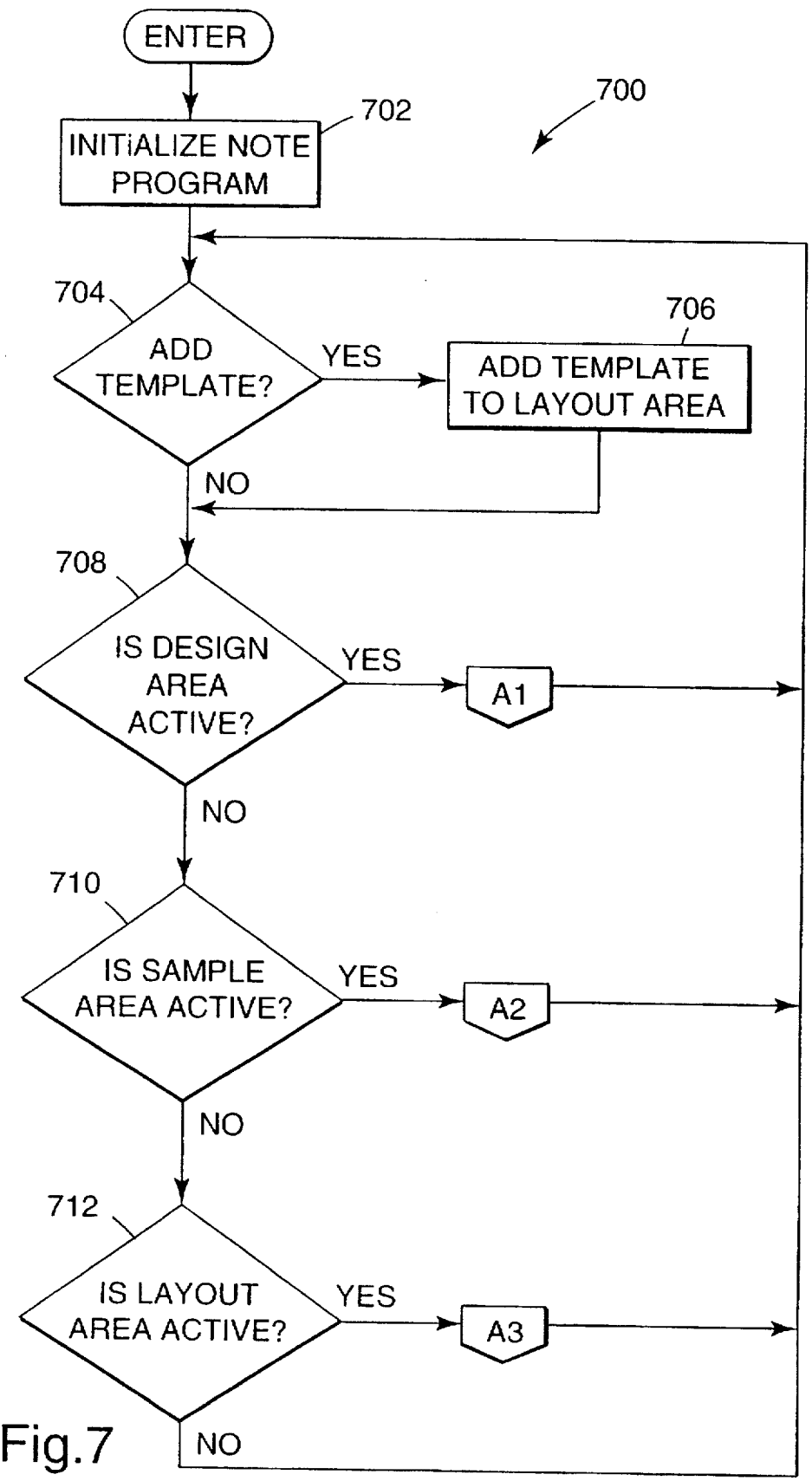
FIGS. 7–10 are flow diagrams of the present invention.

A flow diagram 700, representing the program code of the note design program 118 which implements the features illustrated in FIGS. 2–6, is shown in FIG. 7. As shown in FIG. 7, upon start up, a block 702 initializes the note design program 118. This initialization of the note design program 118 includes displaying the window 202 with the note design area 204, the layout area 206 with a layout window, and the sample area 208 with sample notes. When the window 202 is fully displayed, a user may add layout windows to the layout area 206. Accordingly, if a block 704 determines that the user desires to add a layout window, a block 706 displays the additional layout window, in the format selected by the user, in the layout area 206.

After the block 706 displays the additional layout window in the layout area 206, or if the block 704 determines that the user does not, at this time, desire to add an additional layout window to the layout area 206, a block 708 determines whether or not the note design area 204 is active. If the note design area 204 is active, a routine A1 is entered. If the block 708 determines that the note design area 204 is not active, a block 710 determines whether a sample note in the sample area 208 is active. If the block 710 determines that a sample note in the sample area 208 is active, a routine A2 is entered. If the block 710 determines that a sample note in the sample area 208 is not active, a block 712 determines whether a note cell in a selected layout window displayed in the layout area 206 is active. If the block 712 determines that a note cell in a selected layout window displayed in the layout area 206 is active, a routine A3 is entered. If the block 712 determines that a note cell in a selected layout window displayed in the layout area 206 is not active, or after the routine A1 is performed, or after the routine A2 is performed, or after the routine A3 is performed, program flow returns to the block 704.

Figure 8A:
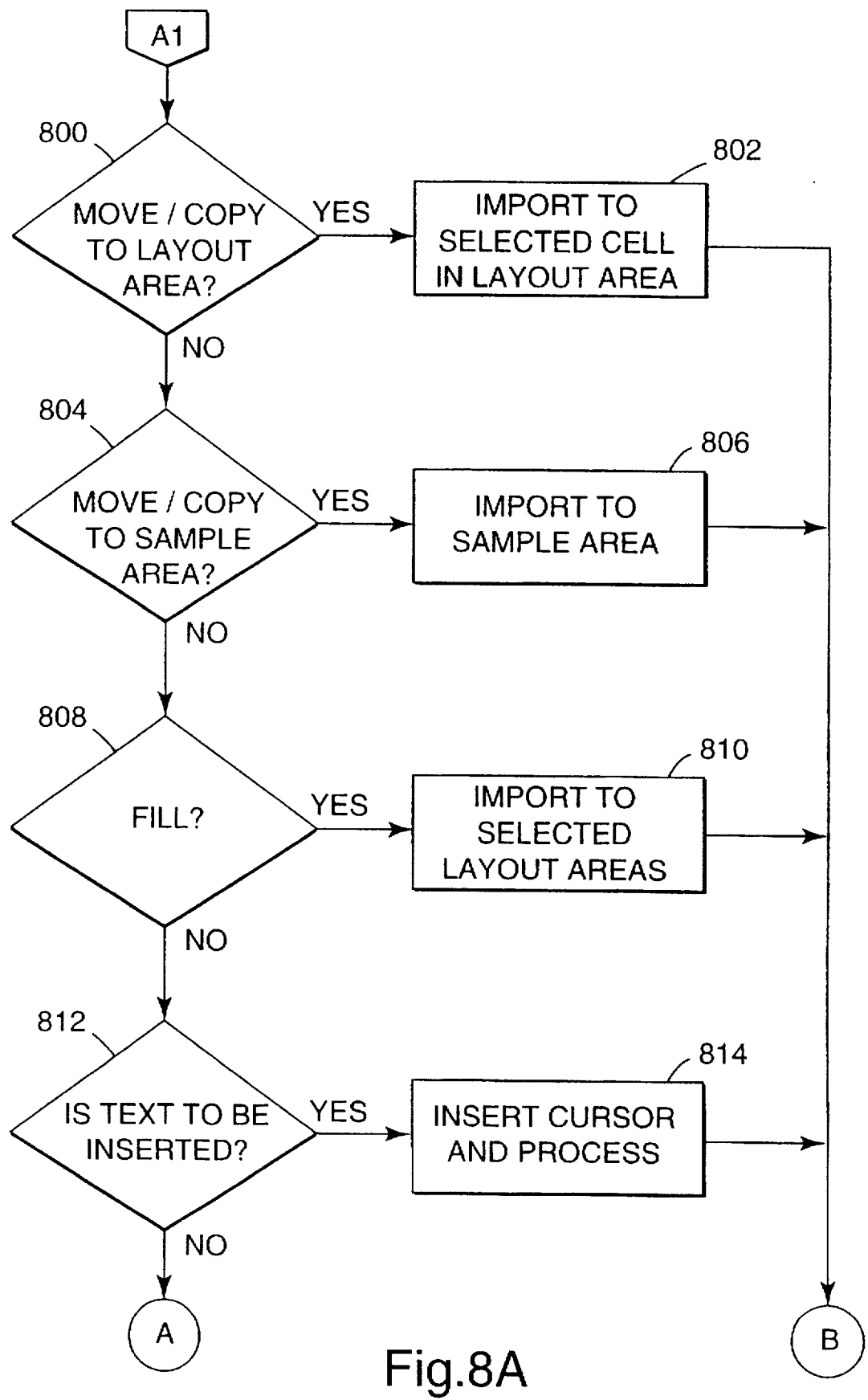
Figure 8B:
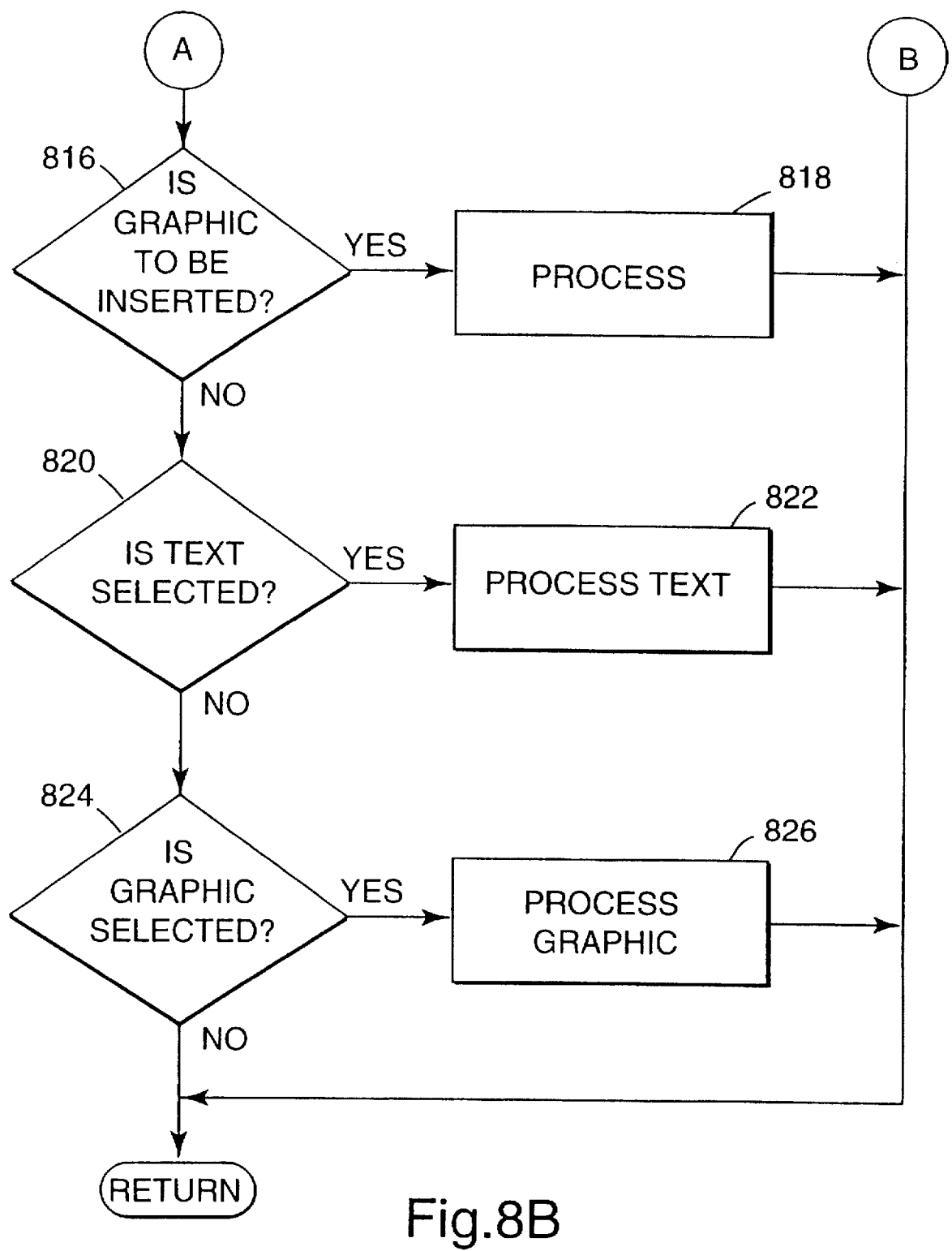

The routine A1 is illustrated in FIGS. 8A and 8B. Upon entry of the routine A1 (when the note design area 204 is active), a block 800 determines whether or not the note which is currently selected is to be imported to a cell in the layout area 206 (e.g., by selecting one or more elements of the note in the note design area 204 and dragging and dropping, copying and pasting, or clicking the selected elements into another cell in the layout area 206). That is, as discussed above, a note in the note design area 204 also appears in an active note cell in the layout area 206. However, one or more elements of a selected note may be imported to another cell in the layout area 206. If the block 800 determines that a note is to be copied to a cell in the layout area 206, a block 802 imports the note to the selected cell in the layout area 206. If the block 800 determines that a note is not to be copied to a cell in the layout area 206, a block 804 determines whether a note is to be copied, such as from the note design area 204, to the sample area 208. If the block 804 determines that a note is to be copied to the sample area 208, a block 806 imports the note to the sample area 208. The placement of this note in the sample area 208 may be according to any desired protocol. Accordingly, a user may create a custom note design by use of the note design area 204 and may import the custom note design to the sample area 208. When such a custom note design is imported to the sample area 208, the custom note design so imported becomes a sample note.

If the block 804 determines that a note is not to be copied to the sample area 208, a block 808 determines whether one or more note cells of the layout window displayed in the layout area 206 are to be filled with a note such as the note in the design area 204. If so, a block 810 fills (i.e., imports) the selected note cell or cells of the layout window in the layout area 206 with the note.

If the block 808 determines that one or more note cells of the layout window displayed in the layout area 206 are not to be filled, a block 812 determines whether text is to be inserted in the note design area 204 (e.g., the user may choose an appropriate menu selection or button in the menu and button bar 214, or the like, to indicate that text is to be inserted). If the block 812 determines that text is to be inserted into the note design area 204, a block 814 displays an insert cursor and/or box in the note design area 204 and processes any text which the user enters, such as by way of a keyboard of the input devices 106.

If the block 812 determines that text is not to be inserted, a block 816 determines whether a graphic is to be inserted in the note design area 204. If so, a block 818 processes the graphic to be inserted according to the user's instructions.

Accordingly, text and graphics may be individually inserted into the note design area 204.

If the block 816 determines that a graphic is not to be inserted in the note design area 204, a block 820 determines whether text in the note design area 204 is selected. For example, the menu and button bar 214 may contain a text button which, when selected, converts the cursor from a typical arrow cursor to a text cursor. The user may then place this cursor at the text in order to select that text. If the block 820 determines that text in the note is selected, a block 822 then processes the text as instructed by the user.

If the block 820 determines that text in the note design area 204 is not selected, a block 824 determines whether a graphic of the note design area 204 is selected. If so, a block 826 processes the selected graphic as instructed by the user.

After the block 802 imports a note to a selected cell in the layout area 206 and also to the note design area 204, or after the block 806 imports a note to the sample area 208, or after the block 810 fills the selected note cell or cells of the layout window in the layout area 206 with a selected, or after the block 814 displays an insert cursor and/or box in the note design area 204 and processes any text which the user enters, or after the block 818 processes the graphic to be inserted according to the user's instructions, or after the block 822 processes the text of the note design area 204 as instructed by the user, or if the block 824 determines that a graphic of the note design area 204 is not selected, or after the block 826 processes the selected graphic of the note design area 204 as instructed by the user, program flow returns to the block 704 of FIG. 7.

Figure 9:
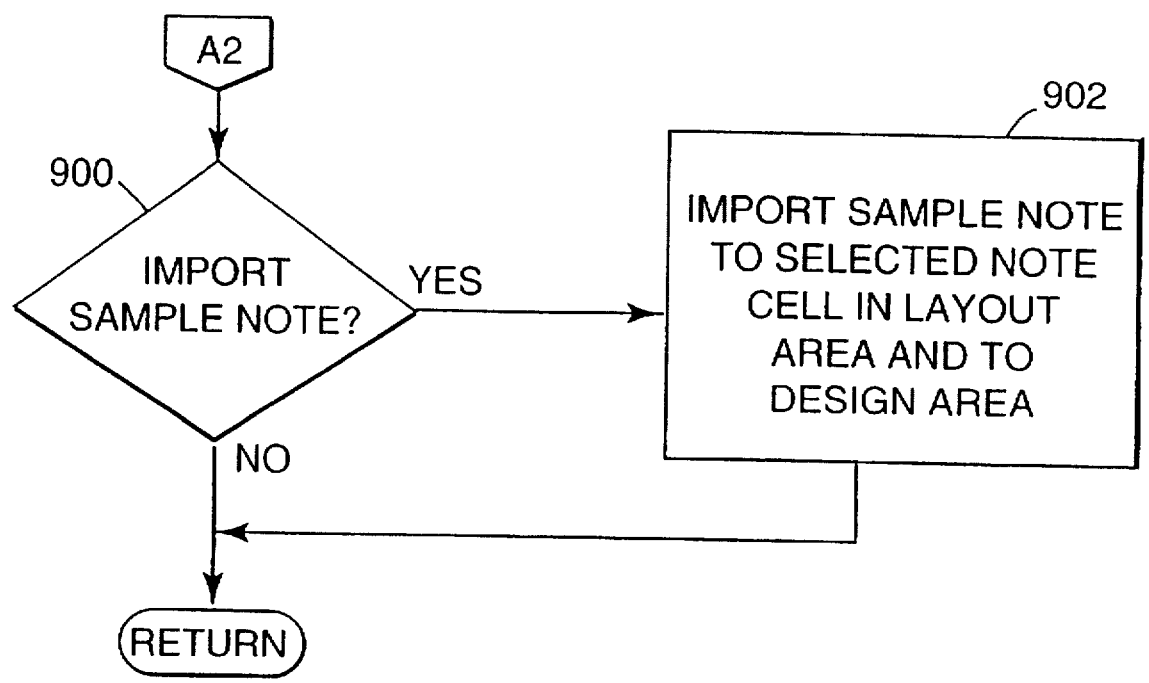

As illustrated in FIG. 9, when the routine A2 is entered (e.g., because a note in the sample area 208 is active), a block 900 determines whether a sample note is to be imported. If so, a block 902 imports the sample note from the sample area 208 to a selected note cell of the layout window displayed in the layout area 206 and to the note design area 204. After the block 902 imports the note from the sample area 208 to the selected note cell of the layout window displayed in the layout area 206 and to the note design area 204, or if the block 900 determines that a sample is not to be imported, program flow returns to the block 704 of FIG. 7.

Figure 10:
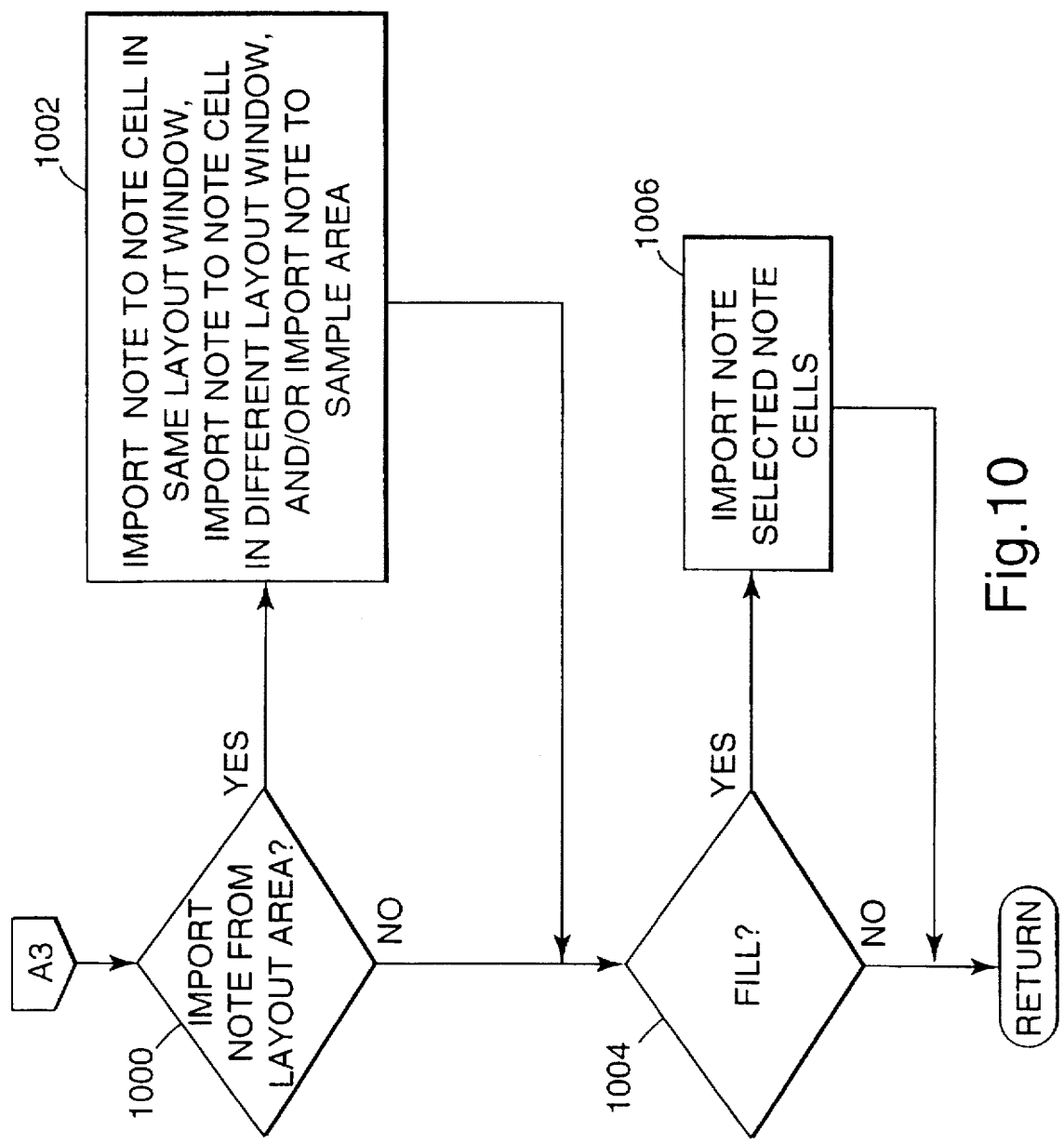

As illustrated in FIG. 10, when the routine A3 is entered (e.g., because a layout window in the layout area 206 is active), a block 1000 determines whether to import a note which is currently in a note cell of the active layout window. If so, a block 1002 imports the note from the note cell in the currently active layout window to a note cell of the same layout window displayed in the layout area 206, to a note cell of another layout window displayed in the layout area 206, or to the sample area 208 at the selection of the user. After the block 1002 so imports the note, or if the block 1000 determines that a note is not to be imported, a block 1004 determines whether one or more other note cells of the active layout window displayed in the layout area 206 are to be filled with the imported note. If so, a block 1006 fills the selected note cell or cells of the active layout window in the layout area 206 with the selected note.

If the block 1004 determines that one or more other note cells of the active layout window displayed in the layout area 206 are not to be filled with the imported note, or after the block 1006 fills the selected note cell or cells of the active layout window in the layout area 206 with the selected note, program flow returns to the block 704 of FIG. 7.

Figure 11:
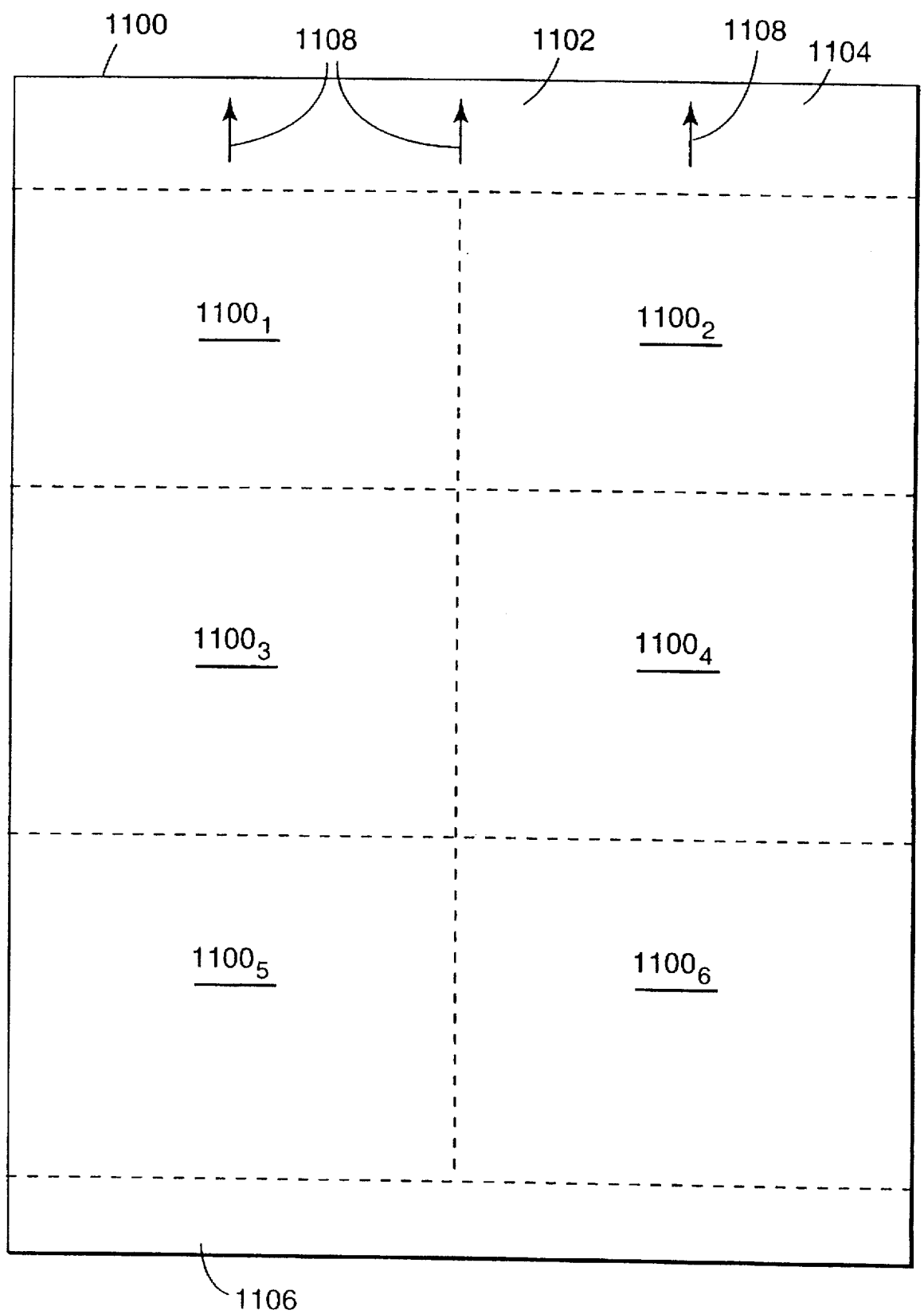
FIG. 11 illustrates an exemplary sheet of notes which may be printed with the notes designed by use of the present invention.

When each of the note cells in an active layout window displayed in the layout area 206 contains a note as selected and/or designed by print these not the user wishes to print these notes, the user inserts into the printer 104b a sheet 1100 as illustrated in FIG. 11. The sheet 1100 is selected to match the layout window to be printed. The sheet 1100 contains a backing ply 1102 with a plurality of sticky back notes $1100_1$–$1100_6$ adhered thereto. The dashed lines shown in FIG. 11 illustrate the division between the sticky back notes $1100_1$–$1100_6$ and between the sticky back notes $1100_1$–$1100_6$ and the backing ply 1102. The sticky back notes $1100_1$–$1100_6$ may be adhered to the backing ply 1102 in any manner, such as by an adhesive which is used with any commercially available sticky back notes.

As illustrated in FIG. 11, the sticky back notes $1100_1$–$1100_6$ do not overlie regions 1104 and 1106 of the backing ply 1102. The region 1104 may contain indicators 1108 in order to indicate to the user the preferred orientation of the sheet 1100 as it is inserted into the printer 104b.

Once the sheet 1100 is inserted into the printer 104b, the user may select a print command from the menu and button bar 214 in order to print the notes which the user has designed with the assistance of the sample notes in the sample area 208 and/or which the user has custom designed.

Certain modifications of the present invention have been discussed above. Other modifications will occur to those practicing in the art of the present invention. For example, while the environment has been described above with respect to the data processing system 100, it should be noted that the present invention can be used in any other operating environment.

Also, the screen display 200 illustrates one arrangement for the note design area 204, the layout area 206, and the sample area 208 contained in the window 202. However, the note design area 204, the layout area 206, and the sample area 208 may be arranged differently within the window 202. In addition, the note design area 204, the layout area 206, and the sample area 208 may be arranged in a format other than a window format.

Moreover, as described above, when a selected sample note is imported from the sample area 208 to a note cell of a layout window displayed in the layout area 206, the selected sample note is also imported to the note design area 204. However, the selected sample note, when imported from the sample area 208 to a note cell of a layout window displayed in the layout area 206 need not also be imported to the note design area 204. Alternatively, or additionally, the note design program 118 may offer the user an option of selecting whether a selected sample note, which is to be imported from the sample area 208 to a note cell of a layout window displayed in the layout area 206, is to be imported both to a note cell of a layout window displayed in the layout area 206 and to the note design area 204, or only to a note cell of a layout window displayed in the layout area 206, or only to the note design area 204.

Furthermore, as described above, all elements of a note may be imported together from certain areas (i.e., the layout area 206 and the sample area 208) to another area. It is also possible to import a single element of a note from these areas to another area. For example, an element of a note to be imported to another area may be highlighted, cut from its current area, and pasted into its target area. Alternatively, an element of a note to be imported to another area may be highlighted and may be imported to the target area by double clicking on the target area. Other means of importing single elements of a note from one area to another are possible.

In addition, according to the description above, a note in the note design area 204 may be imported to the sample area 208 to become a sample note. A note in a note cell of a layout window in the layout area 206 may also be imported to the sample area 208 to become a sample note. Moreover, instead of importing all elements of a note together when the note is imported from one area to another, fewer than all elements may be imported together. For example, when a note is imported from one area to another, only predetermined text and graphics of the note are imported together.

Furthermore, as described above, a note may be dragged or otherwise imported from a note cell of one layout window to a note cell of another layout window displayed in the layout area 206. In addition, a note may be dragged or otherwise imported from a note cell of a layout window to another note cell of the same layout window.

Also, as described above, a single piece of clip art may be imported from the sample area 208 to the note design area 204 and a note cell in a currently active layout window displayed in the layout area 206. However, the note design program 118 may be configured so as to permit plural pieces of clip art to be moved together. For example, it is possible to move plural pieces of clip art together by shift-clicking on a first piece of clip art, by shift-clicking on a second piece of clip art, by selecting Cut from an Edit menu, and by pasting the first and second pieces of clip art in the target area where they are to be imported. Copies of the first and second pieces of clip art thereby appear in the target area.

Moreover, as discussed above, a note in a note cell of a layout window displayed in the layout area 206 may be imported to all cells in that or a different layout window. Alternatively, or additionally, a note in a note cell of a layout window displayed in the layout area 206 may be imported to a selected number of note cells in that, or a different, layout window. Likewise, a note in the design area 204 or in the sample area 208 may be imported to all or a selected number of note cells in a layout window.

In addition, as described above, when the routine A2 is entered, a note may be imported from the sample area 208 to a selected note cell of the layout window displayed in the layout area 206 and to the note design area 204. The routine A2 may also be configured to determine whether other note cells of the layout window displayed in the layout area 206 are to be filled with the imported note. If so, the other cells of the layout window in the layout area 206 are filled with the imported note.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

I claim:

1. A method of designing notes comprising the steps, performed by a data processing system, of:
   a) executing program code in the data processing system so that a sample area is displayed, wherein the sample area contains a sample note;
   b) executing program code in the data processing system so that a layout area is displayed with the sample area, wherein the layout area has a plurality of note cells, and wherein each note cell corresponds to a note to be designed; and,
   c) executing program code in the data processing system so that a design area is displayed simultaneously with the sample area and the layout area, wherein the design area is an area where a note may be designed while viewing the sample area and the layout area, and wherein the design area and the layout area are linked so that, when the sample note from the sample area is imported to one of the design area and the layout area, the sample note automatically appears in the other of the design area and the layout area.

2. The method of claim 1 further comprising the step of executing program code so that the sample note is dragged from the sample area to the design area.

3. The method of claim 2 wherein the sample note has a graphic element and a text element.

4. The method of claim 1 further comprising the step of executing program code so that a user originated note design may be created in the design area.

5. The method of claim 4 further comprising the step of executing program code so that the user originated note design is imported to the sample area as a further sample note.

6. The method of claim 5 wherein the user originated note design has a graphic element and a text element.

7. The method of claim 1 further comprising the step of executing program code so that a note design is imported from one of the layout area and the design area to the other of the layout area and the design area.

8. The method of claim 7 wherein the note design has a graphic element and a text element.

9. The method of claim 1 further comprising the step of executing program code so that a note design is imported from a first note cell of the layout area to a second note cell of the layout area.

10. The method of claim 9 further comprising the step of executing program code so that a user originated note design may be created in the design area.

11. A method of designing notes comprising the steps, performed by a data processing system, of:
   a) executing program code in the data processing system so that a layout area is displayed, wherein the layout area has a plurality of note cells, and wherein each note cell corresponds to a note to be designed;
   b) executing program code in the data processing system so that a design area is displayed simultaneously with the layout area, wherein the design area is an area where a note may be designed;
   c) executing program code in the data processing system so that a sample area is displayed simultaneously with the layout area and the design area, wherein the sample area contains a sample note; and,
   d) executing program code in the data processing system so that a note design is imported from a first note cell of the layout area to a second note cell of the layout area.

12. The method of claim 11 further comprising the step of executing program code so that the sample note is imported from the sample area to the design area.

13. The method of claim 12 wherein the step of executing program code so that the sample note is imported from the sample area to the design area comprises the step of executing program code so that the sample note is dragged from the sample area to the design area.

14. The method of claim 13 wherein the sample note has a graphic element and a text element.

15. The method of claim 12 wherein the sample note has a graphic element and a text element.

16. The method of claim 11 further comprising the step of executing program code so that the sample note is imported from the sample area to a selected note cell of the layout area.

17. The method of claim 16 wherein the step of executing program code so that the sample note is imported from the sample area to a selected note cell of the layout area comprises the step of executing program code so that the sample note is dragged from the sample area to the selected note cell of the layout area.

18. The method of claim 17 wherein the sample note has a graphic element and a text element.

19. The method of claim 16 wherein the sample note has a graphic element and a text element.

20. The method of claim 11 further comprising the step of executing program code so that a user originated note design may be created in the design area.

21. The method of claim 20 further comprising the step of executing program code so that the user originated note design is imported to the sample area as a further sample note.

22. The method of claim 21 wherein the user originated note design has a graphic element and a text element.

23. The method of claim 11 further comprising the step of executing program code so that one or more note cells of the layout area are selected and so that the selected note cells are filled in with a selected note design in response to a single instruction.

24. The method of claim 11 further comprising the step of executing program code so that one or more note cells of the layout area are selected and so that all note cells except for the selected note cells are filled in with a selected note design in response to a single instruction.

25. The method of claim 11 further comprising the step of executing program code so that a note design is imported from one of the layout area and the design area to the other of the layout area and the design area.

26. The method of claim 25 wherein the note design has a graphic element and a text element.

27. A method of designing notes comprising the steps, performed by a data processing system, of:
   a) executing program code in the data processing system so that a layout area is displayed, wherein the layout area has a plurality of note cells, and wherein each note cell corresponds to a note to be designed;
   b) executing program code in the data processing system so that a design area is displayed simultaneously with the layout area, wherein the design area is an area where a note may be designed while viewing the sample area and the layout area, and wherein the design area contains a design note having first and second elements;
   c) executing program code in the data processing system so that a sample area is displayed simultaneously with the layout area and the design area, wherein the sample area contains a sample note; and,
   d) executing program code in the data processing system so that one but not both of the first and second elements of the design note is imported from the design area to the layout area.

28. The method of claim 27 wherein the first element is a graphic element, and wherein the second element is a text element.

29. The method of claim 27 wherein the step of executing program code in the data processing system so that one but not both of the first and second elements of the design note is imported from the design area to the layout area comprises the step of executing program code so that the one of the first and second elements of the design note is dragged from the design area to the layout area.

30. The method of claim 27 further comprising the step of executing program code so that the sample note is imported from the sample area to the design area.

31. The method of claim 30 wherein the sample note has a graphic element and a text element.

32. The method of claim 27 further comprising the step of executing program code so that the sample note is imported from the sample area to a selected note cell of the layout area.

33. The method of claim 32 wherein the sample note has a graphic element and a text element.

34. The method of claim 27 further comprising the step of executing program code so that a user originated note design may be created in the design area.

35. The method of claim 34 further comprising the step of executing program code so that the user originated note design is imported to the sample area as a further sample note.

36. The method of claim 35 wherein the user originated note design has a graphic element and a text element.

37. The method of claim 27 further comprising the step of executing program code so that one or more note cells of the layout area are selected and so that the selected note cells are filled in with a selected note design in response to a single instruction.

38. The method of claim 27 further comprising the step of executing program code so that one or more note cells of the layout area are selected and so that all note cells except for the selected note cells are filled in with a selected note design in response to a single instruction.

39. A method of designing notes comprising the steps, performed by a data processing system, of:
   a) executing program code in the data processing system so that first and second layout areas are displayed, wherein each of the first and second layout areas has a plurality of note cells;
   c) executing program code in the data processing system so that the design area is displayed simultaneously with the first and second layout areas, wherein the design area is an area where a note may be designed while viewing the layout areas and the sample area; and,
   b) executing program code in the data processing system so that a sample area is displayed with the first and second layout areas and a design area, wherein the sample area contains a sample note.

40. The method of claim 39 further comprising the step of executing program code so that a layout note is imported from a note cell of the first layout area to a note cell of the second layout area.

41. The method of claim 40 wherein the step of executing program code so that a layout note is imported from a note cell of the first layout area to a note cell of the second layout area comprises the step of executing program code so that the layout note is dragged from a note cell of the first layout area to a note cell of the second layout area.

42. The method of claim 39 wherein the design area and a first note cell in the first layout area are linked so that a design note in the design area represents a note in the first note cell in the first layout area, wherein the method further comprises the step of executing program code so that the design note is imported from the design area to a first note cell of the second layout area.

43. The method of claim 42 wherein the step of executing program code so that the design note is imported from the design area to a first note cell of the second layout area comprises the step of executing program code so that the design note is dragged from the design area to the first note cell of the second layout area.

44. The method of claim 39 wherein the design area and a first note cell in the first layout area are linked so that a design note in the design area represents a note in the first note cell in the first layout area, wherein the design note has first and second elements, wherein the method further comprises the step of executing program code so that the first element but not the second element of the design note is imported from the design area to a first note cell of the second layout area.

45. The method of claim 44 wherein the step of executing program code so that the first element but not the second element of the design note is imported from the design area to a first note cell of the second layout area comprises the step of executing program code so that the first element of the design note is dragged from the design area to a first note cell of the second layout area.

46. The method of claim 44 wherein the first element is a graphic element, and wherein the second element is a text element.

47. The method of claim 44 wherein the first element is a text element, and wherein the second element is a graphic element.

48. The method of claim 39 further comprising the step of executing program code so that the sample note is imported from the sample area to the design area.

49. The method of claim 48 wherein the step of executing program code so that the sample note is imported from the sample area to the design area comprises the step of executing program code so that the sample note is dragged from the sample area to the design area.

50. The method of claim 48 wherein the sample note has a graphic element and a text element.

51. The method of claim 39 further comprising the step of executing program code so that the sample note is imported from the sample area to a first note cell of the first layout area and so that, when the sample note appears in the first cell of the first layout area, the sample note also appears in the design area without separate manipulation.

52. The method of claim 51 wherein the step of executing program code so that the sample note is imported from the sample area to a first note cell of the first layout area comprises the step of executing program code so that the sample note is dragged from the sample area to the first note cell of the first layout area.

53. The method of claim 51 wherein the sample note has a graphic element and a text element.

54. The method of claim 39 further comprising the step of executing program code so that a user originated note design may be created in the design area.

55. The method of claim 54 further comprising the step of executing program code so that the user originated note design is imported to the sample area as a further sample note.

56. The method of claim 39 further comprising the step of executing program code so that one or more note cells of the first layout area are selected and so that the selected note cells are filled in with a selected note design in response to a single instruction.

57. The method of claim 39 further comprising the step of executing program code so that one or more note cells of the first layout area are selected and so that all note cells except for the selected note cells are filled in with a selected note design in response to a single instruction.

58. A method of designing notes comprising the steps, performed by a data processing system, of:
 a) executing program code in the data processing system so that a sample area is displayed, wherein the sample area contains a sample note;
 b) executing program code in the data processing system so that a layout area is displayed with the sample area, wherein the layout area has a plurality of note cells;
 c) executing program code in the data processing system so that a design area is displayed simultaneously with the sample area and the layout area, wherein the design area is an area where a note may be designed while viewing the sample area and the layout area; and,
 d) executing program code in the data processing system so that one or more note cells of the layout area are selected and so that the selected note cells are filled in with a selected note design in response to a single instruction.

59. A computer readable storage medium having program code stored thereon, wherein the program code is arranged so that, when the program code is executed, (i) a sample area is displayed, (ii) a layout area is displayed with the sample area, (iii) the layout area has a plurality of note cells, (iv) a design area is displayed simultaneously with the sample area and the layout area, and (v) the design area and the layout area are linked so that, when a sample note from the sample area is imported to one of the design area and the layout area, the sample note automatically appears in the other of the design area and the layout area.

60. A computer readable storage medium having program code stored thereon, wherein the program code is arranged so that, when the program code is executed, (i) a sample area is displayed, (ii) the sample area contains a sample note having first and second elements, (iii) a design area is displayed simultaneously with the sample area, (iv) the sample note is imported from the sample area into the design area, and (v) the first and second elements of the sample note in the design area are individually accessible.

61. A computer readable storage medium having program code stored thereon, wherein the program code is arranged so that, when the program code is executed, (i) a layout area is displayed, (ii) the layout area has a plurality of note cells, (iii) a design area is displayed simultaneously with the layout area, (iv) a sample area is displayed simultaneously with the layout area and the design area, and (v) a note design is imported from a first note cell of the layout area to a second note cell of the layout area.

62. A computer readable storage medium having program code stored thereon, wherein the program code is arranged so that, when the program code is executed, (i) a layout area is displayed, (ii) the layout area has a plurality of note cells, (iii) a design area is displayed simultaneously with the layout area, (iv) the design area contains a design note having first and second elements, (v) a sample area is displayed simultaneously with the layout area and the design area, and (vi) one but not both of the first and second elements of the design note is imported from the design area to the layout area.

63. A computer readable storage medium having program code stored thereon, wherein the program code is arranged so that, when the program code is executed, (i) first and second layout areas are displayed, (ii) each of the first and second layout areas has a plurality of note cells, (iii) a design area is displayed simultaneously with the first and second layout areas, and (iv) a sample area is displayed simultaneously with the first and second layout areas and the design area.

64. A computer readable storage medium having program code stored thereon, wherein the program code is arranged so that, when the program code is executed, (i) a sample area is displayed and the sample area contains a sample note, (ii) a layout area is displayed with the sample area, (iii) the layout area has a plurality of note cells, (iv) a design area is displayed simultaneously with the sample area and the layout area, (v) one or more note cells of the layout area are selected, and (vi) the selected note cells are filled in with a selected note design in response to a single instruction.

65. A software-implemented method for designing notes comprising:
 displaying a sample area containing one or more sample notes;
 displaying a layout area simultaneously with the display of the sample area, the layout area including one or more notes to be designed by a user;
 displaying a design area simultaneously with the display of the sample area and the layout area, the design area providing an area for design of one or more notes by a user while viewing the sample area and the layout area;
 processing user input specifying one of the sample notes to be imported into the design area;
 importing the specified sample note into the design area;
 displaying the specified sample note in the design area simultaneously with the display of the sample area and the layout area;
 processing user input specifying one of the user-designed notes to be imported into the sample area;
 importing the specified user-designed note into the sample area;
 displaying the specified user-designed note in the sample area simultaneously with the display of the design area and the layout area;
 processing user input specifying importation of one of the user-designed notes into one or more notes in the layout area;

importing the specified user-designed note into the specified notes in the layout area; and displaying the specified user-designed note in the specified notes in the layout area simultaneously with display of the design area and the layout area.

66. A computer readable medium encoded with a computer program, the program being arranged such that, when the program is executed, a computer performs the steps of:

displaying a sample area containing one or more sample notes;

displaying a layout area simultaneously with the display of the sample area, the layout area including one or more notes to be designed by a user;

displaying a design area simultaneously with the display of the sample area and the layout area, the design area providing an area for design of one or more notes by a user while viewing the sample area and the layout area;

processing user input specifying one of the sample notes to be imported into the design area;

importing the specified sample note into the design area;

displaying the specified sample note in the design area simultaneously with the display of the sample area and the layout area;

processing user input specifying one of the user-designed notes to be imported into the sample area;

importing the specified user-designed note into the sample area;

displaying the specified user-designed note in the sample area simultaneously with the display of the design area and the layout area;

processing user input specifying importation of one of the user-designed notes into one or more notes in the layout area;

importing the specified user-designed note into the specified notes in the layout area; and displaying the specified user-designed note in the specified notes in the layout area simultaneously with display of the design area and the layout area.

67. A software-implemented method comprising:

displaying a sample area containing one or more sample notes;

displaying a layout area simultaneously with the display of the sample area, the layout area including one or more notes to be designed by a user;

displaying a design area simultaneously with the display of the sample area and the layout area, the design area providing an area for design of one or more notes by a user while viewing the sample area and the layout area;

processing user input specifying one of the sample notes to be imported into the design area;

simultaneously importing the specified sample note into the design area and into a corresponding note in the layout area; and displaying the specified sample note in the design area and the corresponding note in the layout area simultaneously with the display of the sample area.

68. A computer readable medium encoded with a computer program, the program being arranged such that, when the program is executed, a computer performs the steps of:

displaying a sample area containing one or more sample notes;

displaying a layout area simultaneously with the display of the sample area, the layout area including one or more notes to be designed by a user;

displaying a design area simultaneously with the display of the sample area and the layout area, the design area providing an area for design of one or more notes by a user while viewing the sample area and the layout area;

processing user input specifying one of the sample notes to be imported into the design area;

simultaneously importing the specified sample note into the design area and into a corresponding note in the layout area; and displaying the specified sample note in the design area and the corresponding note in the layout area simultaneously with the display of the sample area.

69. A software-implemented method for designing notes comprising:

displaying a sample area containing one or more sample notes;

displaying a layout area simultaneously with the display of the sample area, the layout area including one or more notes to be designed by a user;

displaying a design area simultaneously with the display of the sample area and the layout area, the design area providing an area for design of one or more notes by a user while viewing the sample area and the layout area;

processing user input specifying importation of one of the notes from the sample area to the layout area, the sample area to the design area, or the design area to the sample area;

importing the specified note to the specified area; and displaying the specified note in the specified area simultaneously with display of the other areas.

70. A computer readable medium encoded with a computer program, the program being arranged such that, when the program is executed, a computer performs the acts of:

displaying a sample area containing one or more sample notes;

displaying a layout area simultaneously with the display of the sample area, the layout area including one or more notes to be designed by a user;

displaying a design area simultaneously with the display of the sample area and the layout area, the design area providing an area for design of one or more notes by a user while viewing the sample area and the layout area;

processing user input specifying importation of one of the notes from the sample area to the layout area, the sample area to the design area, or the design area to the sample area;

importing the specified note to the specified area; and displaying the specified note in the specified area simultaneously with display of the other areas.

* * * * *